Aug. 9, 1932.  C. W. ELDER  1,870,773
COMPOSITION ROLLER
Original Filed Jan. 28, 1929
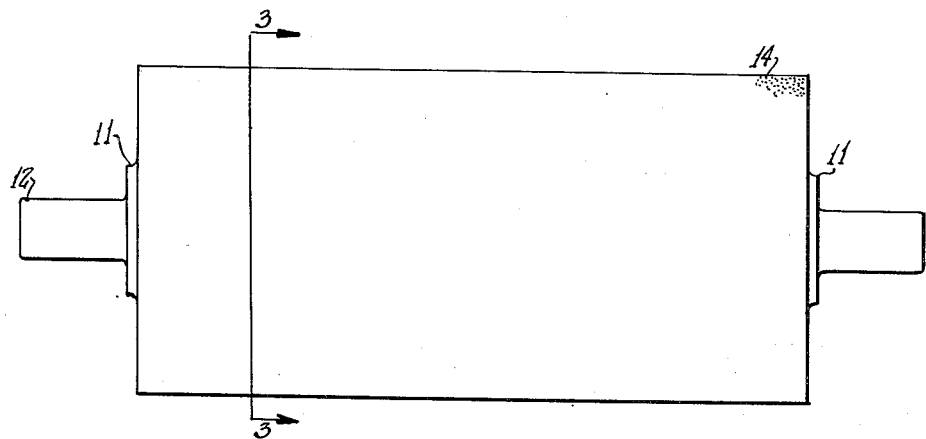
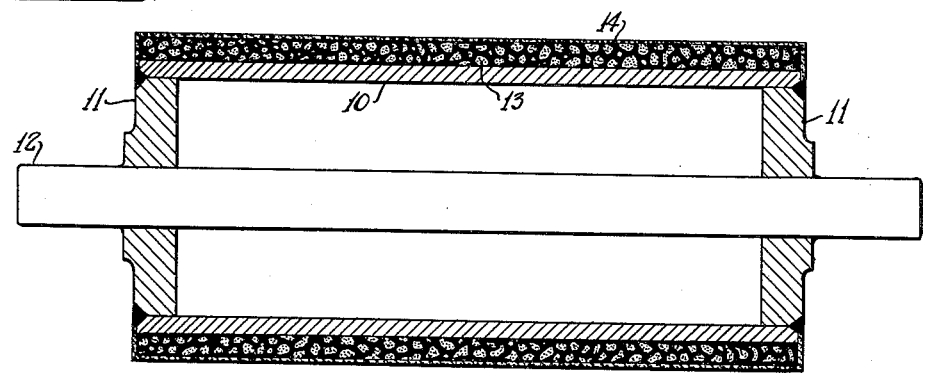
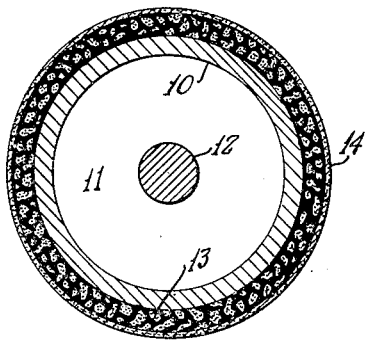
INVENTOR
C. W. Elder
BY C. B. Birkenbeuel
ATTORNEY Patented Aug. 9, 1932

1,870,773

UNITED STATES PATENT OFFICE

CHARLES W. ELDER, OF ROY, WASHINGTON

COMPOSITION ROLLER

Application filed January 28, 1929, Serial No. 335,705. Renewed December 11, 1931.

This invention relates generally to feed rollers, conveying rollers, pulleys and the like, with special reference to a form of composition roller having a resilient covering.

The main object of this invention is the construction of a light weight roller of great strength which will be relatively low in cost and which will be easy to maintain in a true cylindrical form.

The second object is to so construct the roller that its exterior portion will be resilient and will be enclosed in an air-excluding material.

These, and other objects, will become more apparent from the specification following as illustrated in the accompanying drawing, in which:

Figure 1 is a side elevation of the roller. Figure 2 is a longitudinal section through same showing the preferred construction thereof. Figure 3 is a transverse section taken along the line 3—3 in Figure 1.

Similar numbers of reference refer to similar parts throughout the views.

Referring in detail to the drawing, the roller itself consists of a cylindrical tube 10 whose capped ends 11 are mounted on a shaft 12. Around the tube 10 is formed a layer of cork 13, or other material having the desired resiliency.

In order that a complete cylinder may be formed of cork it is preferable to break same up into small pieces, or even a dust, which can be joined into a single piece by means of a suitable binder such as rubber or other material which will not detract from the resiliency of the cork.

In order to overcome the objection to the composite rolls now in use, many of which employ resilient materials, which objection resides in the fact that the materials therein become vulcanized, changing the shape of the roll and often times cracking and deteriorating to the point where the usefulness thereof will be impaired, I have provided a coating 14 of celluloid or other air-excluding material, preferably applied in the form of paint, which extends around the ends of the roll down to the capped ends 11. I am thereby able to maintain the resiliency of the roll, as well as to add to its appearance, and also to the ease with which it can be cleansed by covering the cork exterior with the paint above mentioned.

In some instances it is desirable to employ what is known as a rubber paint, consisting merely of rubber in solution, which will completely fill all of the pores existing on the exterior of the roll and effectively prevent the entrance of air to the interior of the roll.

It will be understood that pure rubber stock need not be employed as a binder, but re-claimed rubber and what is commonly known as friction stock, ordinarily formed as a waste product in tire mills, may be used to equal advantage, the sole function of the rubber being to form an elastic binder for the cork. In its preferred form the cork predominates largely over the rubber in the ratio of about four to one by volume.

While I have shown a roller as being thus formed, it is obvious that the same treatment will apply to pulleys and other similar elements ahaving a cylindrical surface and in which it is desired to have the outer portion thereof as smooth and free from pores as possible.

I am aware that composition rollers, including cork and rubber, have long been manufactured; I therefore do not claim such devices broadly, but I do intend to cover all such forms and modifications thereof as fall fairly within the appended claim.

I claim:

A composition roller having a rigid axis and a resilient cylindrical body formed around said axis consisting of a mixture of four parts of rubber and one part of cork and having the surface of said roller coated with an air excluding material.

CHARLES W. ELDER.